Dec. 28, 1965  J. H. BERRIAN  3,225,524
APPARATUS FOR SEPARATING LIQUID FROM A BINARY
PHASE LIQUID-GAS MIXTURE
Filed May 15, 1961
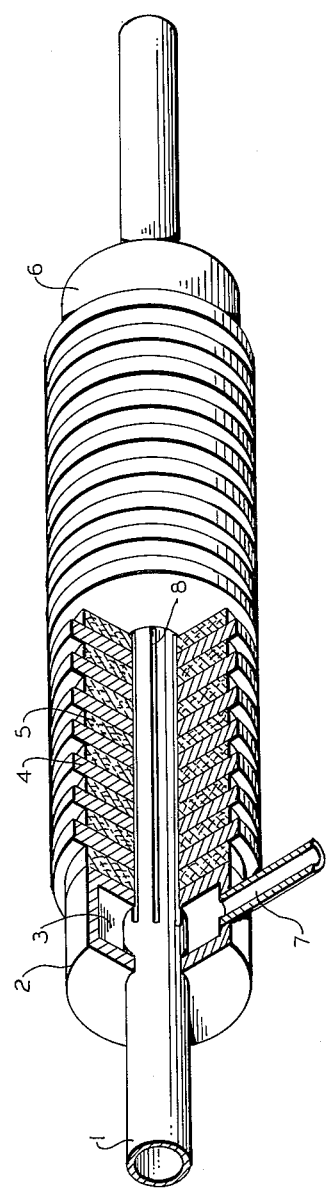
INVENTOR.
JAMES H. BERRIAN
BY
ATTORNEY

United States Patent Office 3,225,524
Patented Dec. 28, 1965

3,225,524
APPARATUS FOR SEPARATING LIQUID FROM A BINARY PHASE LIQUID-GAS MIXTURE
James H. Berrian, U.S. Navy (Box 31, Life Sciences Dept., U.S. Navy Missile Center, Point Mugu, Calif.)
Filed May 15, 1961, Ser. No. 110,279
1 Claim. (Cl. 55—269)
(Granted under Title 35, U.S. Code (1952), sec. 266)

The invention described herein may be manufactured and used by or for the Government of the United States of America for governmental purposes without the payment of any royalties thereon or therefor.

This invention relates to apparatus for separating liquid from a binary phase mixture of liquid and gas. More particularly the invention relates to apparatus for the separation and recovery of liquid from a binary phase mixture of liquid and gas which are operable under altered gravitational forces such as encountered during flight in space vehicles.

Altered gravitational forces encountered in missile and space flight, ranging from high acceleration on take-off to weightlessness during free-fall, present certain special problems in the manipulation of binary phase liquid-gas mixtures which do not find ready solution in the prior art technology. Under static terrestrial conditions phase separation of such binary phase, liquid-gas mixtures as water and steam, liquid oxygen-oxygen vapor systems is simply accomplished by permitting gravity or centrifugal force to act on the phases which are of different density, thereby forming a boundary or surface between them. Under conditions of change acceleration patterns, vibration, and weightlessness, phase boundaries undergo disorientation within their containers. In such cases, even the displacement of a liquid from a vessel by its vapor or by another gas presents the difficult problem.

An object of the present invention is to provide a system for the condensation, absorption, and recovery of vapor molecules from a gaseous medium, such as, specifically, the removal of water vapor from sealed cabin environments under altered gravitational forces encountered during flight in space vehicles.

Another object of this invention is to provide a device for the selective separation of liquid from a binary phase mixture of liquid and gases, ensuring the collection of the liquid without admixture of the gaseous phase.

Other objects and many of the attendant advantages of this invention will be readily appreciated as the same becomes better understood by reference to the following detailed description when considered in connection with the accompanying drawing wherein the single figure is an axonometric view, partly in cross-section, of a preferred embodiment of the apparatus of the invention.

In essence, the apparatus of the invention comprises a body of porous material capable of being wetted by the liquid to be separated and capable of transmitting the liquid by capillary action; in addition, the apparatus includes means for subjecting the porous body to a pressure differential, not exceeding the hereinafter-defined critical phase partition pressure differential, to cause the liquid to pass through the capillary pores of the porous body.

Comprehended within the concept of the invention is the discovery that, when a porous solid body, wettable by, and capable of transmitting by capillary action, a particular liquid, is placed in contact with the liquid in a binary phase mixture of that liquid with a gaseous phase, then, under certain specified conditions of operation, which depend on the composition of the solid body and the properties of the liquid, the liquid can be easily displaced through the porous body by a slight pressure differential, without the passage of the gaseous phase. Under these conditions the porous body accomplishes partition of the liquid and gaseous phases. Above a certain critical maximum pressure differential both liquid and gas will pass through the porous body. Liquid can be displaced through the body by the least force, provided that the body is wetted on both surfaces so that, in effect, by virtue of capillary action, the body is wet along the entire length of the capillaries through which the liquid is to pass. However, much higher force is required to drive gas through the porous body. The porous body of this invention can evidently be regarded as a solid matrix traversed by pores of capillary size, that is, of microscopic cross-section. Thus the porous body can be regarded as a membrane which serves as a filter capable of selecting the liquid from a binary phase liquid-gas mixture and refusing to pass the gas phase. This principle of operation of the porous body with a pressure differential across it not exceeding the critical phase partition pressure differential can be termed "selective phase filtration." The elements that are capable of such operation are termed "selective phase filters."

To carry out the invention, such a selective phase filter is disposed with one region or surface thereof in contact with liquid in a binary phase mixture of liquid and gas, and the filter is then subjected to a pressure differential between this first surface or region of the filter and a second region or surface of the filter to which second region or surface the liquid is to be driven. The higher of the pressures constituting the pressure differential is maintained at the first region. When this pressure differential is kept at a value not exceeding the critical phase partition differential, then liquid, but not gas, is driven through the capillary pores of the filter from the region of the filter in contact with the binary phase mixture.

One useful system for the employment of the invention involves the production of water by the extraction of water vapor from an atmosphere, such as air containing water vapor, which would typically be found in a sealed cabin of a space vehicle. Conveniently such a system would involve condensation of the steam or water vapor on, or near enough to, the high pressure region of a selective phase filter so that liquid water contacts the high pressure region of the filter. This condition can be accomplished either by cooling the high pressure region of the filter sufficiently to produce condensation directly on it or by cooling a body in close juxtaposition to the high pressure region of the filter so that a droplet, for example, of water formed on the adjacent body will extend into contact with the high pressure region of the filter. By maintaining the filter under a pressure differential not exceeding the critical phase partition pressure differential, the water formed on the filter from the condensation of the water vapor from the atmosphere is caused to pass through the filter to the exclusion of the gaseous phase and can thus be collected from the low pressure region of the filter.

Apparatus for carrying out the condensation of vapor, such as steam, can be constructed by the incorporation of cooled thermal conductors within the composition of the matrix or by constructing the matrix to be of material sufficiently thermally conductive so as to serve as its own cooled condensing surface. This latter type of condensation can make use of such porous, heat-conducting bodies as metals made by powder metallurgy. In all such cases where the apparatus embodies condensation as one of its functions the apparatus becomes a condenser-collector and heat exchanger.

Reference is now made to the drawing which shows one preferred embodiment of an apparatus of the present invention intended as a thermally-conductive selective phase filter, forming part of an operational complex including a binary phase mixture of water in liquid and vapor states, to be used in a vapor condenser-collector system for removal of water vapor from air. This embodiment includes a metal tube 1 made of any good heat conductor which can carry a satisfactory coolant. In one model, dural has been used quite satisfactorily. Tightly fitting on the tube 1 is an end plate 2 forming one wall of a collecting chamber 3 for compressing a stack of alternate discs of heat-conductive metal 4 and filter paper discs 5 against an opposite end plate 6. The conducting metal discs 4 have also satisfactorily been made of dural. The filter paper discs have been found quite satisfactory when made of glass fiber. The metal discs 4 are mounted in good contact, for heat-conducting relation, with tube 1. By means of a vacuum applied to the nipple 7 extending from the chamber 3 a pressure differential is produced radially across the filter discs 5. Flutes or shallow grooves 8 formed on the exterior of tube 1 receive water issuing from the inner periphery of the discs 5 and transmit the water to the collecting chamber 3.

A particular model of this embodiment using a dural tube with an outer diameter of 1.3 cm., dural discs 1.01" in thickness and 2.2 cm. in outer diameter, and using glass fiber filter paper 1.01" in thickness and 2.1 cm. in outer diameter exhibited a critical partition pressure differential of 30" of water. The critical partition pressure differential for any operational complex having different constituent elements can readily be determined by trying out various pressure differentials and observing the maximum differential which permits only liquid and no gaseous phase to pass through the filter.

*Operation*

To carry out the invention with the aforedescribed embodiment of the apparatus, a refrigerant is circulated through the tube 1 causing the plates 5 to be cooled by heat conduction to tube 1. Water droplets are formed by condensation of vapor on the outer surface of the condensing plates 5. The droplets on the plates grow in size until they make contact with the glass fiber filter elements and they are then immediately drawn into the matrix by capillary action. Providing that a slight pressure differential is maintained across the porous body, the water is transferred through the glass fiber discs into the collecting channels 8 and thence into the collecting chamber 3. As long as this pressure differential does not exceed the critical partition pressure differential, which for this embodiment is 30" of water, gaseous medium is not passed through the porous, capillary-active elements.

Obviously many modifications and variations of the present invention are possible in the light of the above teachings. It is therefore to be understood that within the scope of the appended claim the invention may be practiced otherwise than as specifically described.

What is claimed is:

An apparatus comprising a tube of thermally conducting material through which a coolant can be passed, said tube having a plurality of flutes extendnig longitudinally on its outer surface; that portion of said tube in the vicinity of said flutes having its wall imperforate to prevent any transfer of fluids between the interior and exterior of said tube a plurality of discs of porous material, each disc constituting a membrane capable of transmitting liquid by capillary action, sleeved on said tube with their inner peripheries in contact with said flutes; a plurality of thermally conducting discs also sleeved on said tube in intimate contact with said tube to facilitate heat flow between said thermally conducting discs and said tube; each of said first mentioned porous discs being interlaminated between a pair of said thermally conducting discs so as to be in contact on opposite surfaces thereof with each, respectively, of said pair of thermally conducting discs; means compressing said interlaminated plurality of discs together against one another; a collecting chamber in communication with said flutes to collect liquid reaching said flutes; and means for applying suction to said chamber in order to produce a pressure differential across said membranes in the direction extending from the outer peripheries of said membranes toward the inner peripheries of said membranes in contact with said flutes.

References Cited by the Examiner

UNITED STATES PATENTS

| | | | |
|---|---|---|---|
| 2,389,431 | 11/1945 | Hallinan | 210—443 X |
| 2,801,707 | 8/1957 | Asker | 55—33 |
| 2,857,979 | 10/1958 | Van Dijck. | |
| 2,970,669 | 2/1961 | Bergson | 55—269 |
| 2,978,108 | 4/1961 | Strassheim | 210—448 X |

REUBEN FRIEDMAN, *Primary Examiner.*

NORMAN YUDKOFF, HERBERT L. MARTIN, D. K. WEDDING, *Examiners.*